United States Patent [19]

Turro

[11] 4,351,707

[45] Sep. 28, 1982

[54] METHODS EMPLOYING MAGNETIC ISOTOPE EFFECT

[75] Inventor: Nicholas J. Turro, Tenafly, N.J.

[73] Assignee: Alpine Kinetics, Inc., Northvale, N.J.

[21] Appl. No.: 92,483

[22] Filed: Nov. 8, 1979

[51] Int. Cl.$^3$ ............................................. C07G 13/00
[52] U.S. Cl. ........................... 204/158 R; 204/162 R
[58] Field of Search ........ 204/158 R, 158 HE, 162 R, 204/163 R; 252/316

[56] References Cited

U.S. PATENT DOCUMENTS

| | | | |
|---|---|---|---|
| 3,406,184 | 10/1968 | Raasch | 204/16 BR |
| 3,408,276 | 10/1968 | Rey | 204/162 R |
| 3,472,749 | 10/1969 | Bradshaw et al. | 204/162 R |
| 3,491,005 | 1/1970 | Wakamatsu et al. | 204/158 R |
| 3,497,435 | 2/1970 | Wimer et al. | 204/158 R |
| 3,600,291 | 8/1971 | Wiley | 204/162 R |
| 3,616,377 | 10/1971 | Arnold et al. | 204/162 R |
| 3,723,271 | 3/1973 | Schulte-Elte | 204/162 R |
| 3,944,511 | 3/1976 | Taylor | 204/162 R |
| 4,021,364 | 5/1977 | Speiser et al. | 252/316 |
| 4,045,316 | 8/1977 | Legan | 204/162 R |

OTHER PUBLICATIONS

Russian J. Phys. Chem., vol. 51, No. 10, 1977, pp. 1445–1451, Buchachynko, "Enrichment of Magnetic Isotopes–New Method of Investigation of Chemical Reaction".
Russian Chem. Rev., vol. 46, No. 4 (1977), pp. 297–315, Sagdeev et al, "Influence of Magnetic Field on Processes Involving Radicals and Triplet Molecules in Solutions".
Cristo et al.: "Photochemical Transformations . . . ", J. Org. Chem., vol. 40, No. 6, 1975, pp. 667–672.
Horspool: "Photochemistry, Aspects of", Academic Press (1976), pp. 75–79, 105–109.

*Primary Examiner*—Sal Cangialosi
*Attorney, Agent, or Firm*—Shapiro and Shapiro

[57] ABSTRACT

Separation and enrichment of isotopes are effected and rates and products of reactions are controlled by methods employing magnetic isotope effect. By virtue of the invention, when dibenzyl ketone was photolyzed to partial conversion in a dimensionally restricted environment (micelles in soap solution) $^{13}C$ enrichment of over 100% was achieved. The $^{13}C$ enrichment was found to occur specifically at the carbonyl carbon and to be magnetic field dependent.

14 Claims, No Drawings

METHODS EMPLOYING MAGNETIC ISOTOPE EFFECT

BACKGROUND OF THE INVENTION

This invention relates to methods for the separation and enrichment of isotopes and for the controlling of rates and products of reactions.

Isotopes of many elements are in demand in large quantities for a variety of uses ranging from fueling light water moderated reactors ($^{235}U$ enriched) to biological tracing experiments ($^{13}C$, $^{17}O$). Deuterium is needed for heavy water moderated reactors which permit use of natural uranium.

The conventional methods of isotopic enrichment, utilizing differences in physical, chemical or spectroscopic properties that result from differences in diffusional properties, boiling points or chemical reaction rates, permit separation of isotopes of different masses. In general, the efficiency of separation achieved by these methods is very small. If the spectroscopic properties of two isotopes differ, it is sometimes possible to employ laser induced isotope separation. This method is not general and is usually not applicable to polyatomic molecules which tend to possess complex absorption bands.

The conventional methods for separation of isotopes are (a) limited to low efficiency if separation is based on physical or chemical differences in isotopic species and (b) limited in application to small molecules with distinct spectroscopic properties characteristic of different isotopes.

BRIEF SUMMARY OF THE INVENTION

This invention involves a totally different concept for isotope separation and enrichment that depends both on the physical properties of nuclear magnetic moment and molecular diffusion, the chemical properties of radicals and the mechanism of interconversion of different spin states.

The mechanism of the invention utilizes the following effect. There is an inherent difference in the rate of intersystem crossing of any radical pair which contains magnetic nuclei and a radical pair which does not contain magnetic nuclei. The radical pair containing magnetic nuclei undergo intersystem crossing faster because they possess a mechanism (interaction of a magnetic nucleus with an odd electron) for intersystem crossing which is not available to the radical pair not possessing magnetic nuclei. If a process whose rate does not depend on magnetic effects competes with intersystem crossing for destruction of the radical pair, then the probability of reaction and the type of reaction that the radical pair undergoes will be dependent upon the presence or absence of magnetic isotopes in the radical pair.

Consider, for example, a radical pair (à* ḃ) which contains a magnetic nucleus in the à* radical (signified by *) and a radical pair (à ḃ) which contains no magnetic nuclei. If the radical pair à*,ḃ undergoes some reaction after intersystem crossing that leads to a chemical species that is different from the products of reaction of à,ḃ, then an isotopic separation has been effected.

As an illustrative example of the invention, consider the fates of the triplet radical pairs $^3$(à*,ḃ) and $^3$(à,ḃ). The magnetic isotope effect will cause the intersystem crossing $^3$(à*,ḃ)→$^1$(à*,ḃ) to occur faster than the analogous step $^3$(à,ḃ)→$^1$(à,ḃ). To enhance desired isotope enrichment a solvent cage may be utilized. Since reactions of $^1$(à*,ḃ) in a solvent cage differ from those of $^3$(à*,ḃ), products from $^1$(à*,ḃ) in a solvent cage will be enriched in the magnetic isotope if $^3$(à,ḃ)→$^1$(à,ḃ) intersystem crossing does not occur or is inhibited because of competing processes of $^3$(à,ḃ), such as diffusional separation or irreversible reaction.

Although the rate of the intersystem crossing is always faster for the $^3$(à*,ḃ) pair relative to the $^3$(à,ḃ) pair, a solvent separation of either radical pair is utilized for effective interaction of the magnetic nucleus with the odd electron. However, solvent separation is invariably associated with total separation into free radicals and the loss of the ability of the magnetic nucleus to effectively enhance the intersystem crossing rate of $^3$(à* ḃ) to produce $^1$(à*,ḃ) radicals that can reform a caged radical pair and give cage reactions. In order to have both the solvent separation necessary to allow effective $^3$(à*,ḃ)→$^1$(à*,ḃ) intersystem crossing and return of $^1$(à*,ḃ), reactions are conducted in an environment of restricted dimensionality, such as micelle forming soap (surfactant) solutions, which sequester the radical pair and allow diffusional separation but also provide a boundary which prevents the radicals from escaping to form free radicals.

As an actual experimental example of the above concepts and mechanism in accordance with the invention, it has been shown that photolysis of dibenzyl ketone to partial conversion in aqueous soap solution results in strong enrichment of the recovered ketone and in a reaction product (eq. 1) in $^{13}C$ relative to $^{12}C$ and that the enrichment occurs predominantly at the carbonyl carbon. Repetition of the corresponding photolysis in homogeneous solution results in insignificant isotopic enrichment.

$$PhCH_2COCH_2Ph \xrightarrow{h\nu} \tag{1}$$

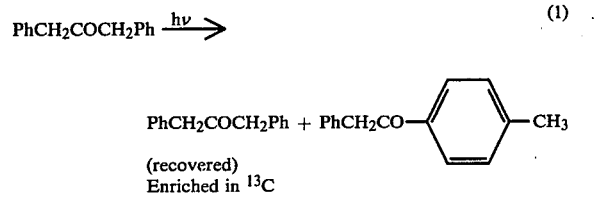

(recovered) Enriched in $^{13}C$

The extent of enriching is strongly affected by the presence of an external field, as is the rate of photolysis.

Photolysis of an unsymmetrical ketone ACOB in micelle forming soap solutions results in selective formation of AB+CO via a free radical reaction. In homogeneous solution AB, AA and BB are formed in comparable amounts. The selective formation of AB in soap solution is proof that the radicals Å and Ḃ when formed in a micelle are incapable of forming free radicals. This result also demonstrates that syntheses may be controlled by performing reactions in micelle forming soap solutions or other environments providing restricted dimensionality.

"Restricted dimensionality" connotes the reduction of degree of freedom of motion of a molecule (or molecular fragment) relative to the situation in a homogeneous, isotropic fluid solution. For example, restrictions are placed on the distance an organic molecule (or organic molecular fragment) may translate from a given point when the molecule is sequestered into a micelle. Although the interior of the micelle provides a medium that resembles a homogeneous, isotropic fluid solution, the highly polar interface that separates the hydrophobic and hydrophilic portions of the micelle is a reflecting boundary for organic species. This restricts the translational motion of the organic species to regions of space inside the micelle. Other environments that provide restricted dimensionality include gels, molecular sieves, solid surfaces, vesicles, liquid crystals, clatrates and polymers, for example. Spatial containment and time of containment are characteristic of restricted dimensionality.

The applications of the invention include, inter alia, the practical separation and enrichment of isotopes that occur in low natural abundance, the use of magnetic isotope effects and magnetic fields to control the rates and efficiency of radical formation and the course of radical reactions. Since many polymerizations are initiated by free radical formation, the invention serves as a means of controlling the rates of polymerization reactions. The invention may be applied to thermal reactions that produce radical pairs and to reactions in different environments that cause a restricted dimensionality for the radical pair.

The concept of isotopic separation by employing electron-nuclear hyperfine coupling (HFC) may be applied generally to any reaction involving a singlet-triplet crossing (or touching) along the reaction coordinate and possessing significant HFC at the structure corresponding to the crossing (or touching). Magnetic isotope effects may be employed for the practical separation or enrichment of isotopes and the control of partitioning along reaction pathways involving intersystem crossing. In addition, they provide a novel mechanistic tool for demonstrating the existence of diradicaloids and singlet-triplet crossings (or touchings) along a reaction coordinate.

The following specific examples are illustrative:

EXAMPLE I

Enrichment experiment with natural abundance DBK 50 ml of a 0.005 m solution of dibenzyl ketone (DBK [Aldrich] sublimed) in 0.05 m hexadecyltrimethylammonium chloride (HDTCl) in distilled water were placed into a quartz vessel of about 3 cm diameter. While stirred mechanically, this solution was irradiated at room temperature with a Hanovia medium pressure mercury lamp, at a distance of 26 cm, using a vycor filter.

The conversion was followed by gas chromatography (GC) and reached 92% after 4.8 hr of photolysis. The reaction solution then was diluted with 50 ml of saturated aqueous sodium sulfate and extracted with $3 \times 50$ ml dilute aqueous sodium sulfate, dried over magnesium sulfate and the solvent stripped off in vacuo. The slightly yellow residue was 35 mg (approx. 85% recovery) and was analyzed by combined gas chromatography-mass spectrometry (GC-MS), showing an increased ratio of M+1 ($^{13}$C) peak compared to a natural abundance standard (18.26 vs. 16.51) corresponding to a 2.5% $^{13}$C content at the carbonyl carbon of DBK.

EXAMPLE II

Photolysis of 1-(p-tolyl)-3-phenyl acetone (TPA) in detergent solution 100 ml of a 0.025 m aqueous solution of hexadecyltrimethylammoniumchloride (HDTCl) containing 17 mg 1-(p-tolyl)-3-phenyl acetone (TPA, sublimed) were placed into a quartz vessel and irradiated with a medium pressure mercury lamp (Hanovia) to various conversions (44%, 95%, 100%), the distribution of the photolysis products (1,2-diphenylethane (=AA), 1,2-di(p-tolyl)ethane (=BB) and 1-(p-tolyl)-2-phenylethane (=AB) was checked by GC and was found to have the constant ratio AA:BB:BB of 2:96:2.

DIBENZYLKETONE $^{13}$C-ENRICHMENT AND MAGNETIC FIELD EFFECT

EXAMPLE III

Experiment in the field of 15,000 Gauss 50 ml of a stock solution of $^{13}$C-enriched (on the carbonyl) dibenzylketone (DBK) (0.005 m DBK in 0.05 m HDTCl/H$_2$O) were placed into a quartz vessel (about 3 cm) and put into the center of a strong magnet. A field of 15,000 G was applied and the sample irradiated with the Hanovia medium pressure mercury lamp, while the solution was vigorously stirred mechanically. After 4.6 hr. the conversion (as determined by GC) was at 93%. The sample was worked up as described before, with approx. 90% recovery. GC-MS-analysis and $^1$H-NMR (proton nuclear magnetic resonance) inicated an increased $^{13}$C-content of the carbonyl of recovered DBK from 47.6% (standard) to 54.7% $^{13}$C.

EXAMPLE IV

Experiment in absence of a field 90 ml of the same stock solution were placed into the quartz vessel and put into the center of the magnet with soft-iron shielding from residual magnetism. As before this solution was irradiated (in absence of an applied field) and after 6.5 hr. 90.5% conversion was attained (after 4.2 hr. 80% conversion was noted). The sample was worked up as above (90% recovery) and analyzed for the $^{13}$C-content of the carbonyl carbon in the recovered DBK. MS and $^1$H-NMR indicated an increase (from 47.6%) to 63.6%.

Additional details of the theory and practice of the invention are available in a paper by Nicholas J. Turro and Bernhard Kraeutler published in the Journal of the American Chemical Society, Volume 100 (Nov. 8, 1978), beginning at page 7432. This paper and the references therein are incorporated herein by reference.

While several preferred embodiments of the invention have been described, it will be apparent to those skilled in the art that changes can be made in these embodiments without departing from the principles and spirit of the invention, the scope of which is defined in the appended claims.

I claim:

1. In a chemical reaction system having radical pairs in the triplet state, some of which have magnetic nuclei and others of which have non-magnetic nuclei, a method of controlling reactions in said system involving the conversion of said radical pairs from the triplet state to the singlet state comprising providing an environment of restricted dimensionality for said radical pairs wherein the environment of restricted dimensionality is selected from the group consisting of micelles, gels, molecular sieves, vesicles, liquid crystals, and clathrates.

2. A method in accordance with claim 1, further comprising applying an external magnetic field to the reaction system.

3. In a chemical reaction system involving molecules of a substance which produce radical pairs in the triplet state, some of which have magnetic nuclei and others of which have non-magnetic nuclei, a method of enhancing the reformation of molecules from radical pairs containing magnetic nuclei by the conversion of radical pairs from the triplet state to the singlet state, comprising providing an environment of restricted dimensionality for the radical pairs wherein the environment of restricted dimensionality is selected from the group consisting of micelles, gels, molecular sieves, vesicles, liquid crystals, and clathrates.

4. A method in accordance with claim 1 or 3, wherein the chemical reaction system involves a process whose rate does not depend on magnetic effects and that competes with intersystem crossing or touching for destruction of a radical pair.

5. A method in accordance with claim 1 or 3, wherein the method produces enrichment of an atomic species.

6. A method in accordance with claim 1 or 3, wherein the method produces separation of atomic species.

7. A method in accordance with claim 1 or 3, wherein the chemical reaction system includes a photochemical or thermal reaction that proceeds along one pathway in the triplet state and along another pathway in the singlet state.

8. A method in accordance with claim 1 or 3, wherein the method involves the enrichment of $^{13}C$ via the photolysis of ketones in soap solution providing the environment of restricted dimensionality.

9. A method in accordance with claim 1 or 3, wherein the chemical reaction system involves free radical formation via photolysis of ketones in soap solution providing the environment of restricted dimensionality and wherein at least one of the rate of reaction, the rate of free radical formation, and the reaction products are affected by the restricted dimensionality.

10. In a chemical reaction system involving the conversion of radical pairs from the triplet state to the singlet state, some radical pairs having magnetic nuclei and others having non-magnetic nuclei, and involving a process that competes with said conversion, a method of enhancing the conversion of radical pairs having magnetic nuclei relative to the conversion of radical pairs that do not have magnetic nuclei and relative to the competing process, comprising providing an environment of restricted dimensionality for said radical pairs wherein the environment of restricted dimensionality is selected from the group consisting of micelles, gels, molecular sieves, vesicles, liquid crystals, and clathrates.

11. A method in accordance with claim 10, wherein said competing process competes with intersystem crossing or touching for destruction of a radical pair and has a rate which does not depend on magnetic effects.

12. A method in accordance with claim 11, wherein said competing process comprises diffusion.

13. A method of isotope enrichment of a chemical compound having both magnetic and non-magnetic isotopes of a chemical element, comprising forming radical pairs in the triplet state from molecules of the compound, some of said radical pairs including a magnetic isotope of the chemical element and other radical pairs including a non-magnetic isotope of the chemical element, and providing for said radical pairs an environment of restricted dimensionality such that the radical pairs containing said magnetic isotope are preferentially converted to the singlet state wherein the environment of restricted dimensionality is selected from the group consisting of micelles, gels, molecular sieves, vesicles, liquid crystals, and clathrates.

14. A method in accordance with claim 13, wherein said method involves the enrichment of $^{13}C$ via the photolysis of ketones in soap solution providing the environment of restricted dimensionality.

* * * * *